July 28, 1953 M. MARON 2,647,174
ADJUSTABLE BEAM-TRACE-POSITIONING AMPLIFIER
Filed Sept. 23, 1950
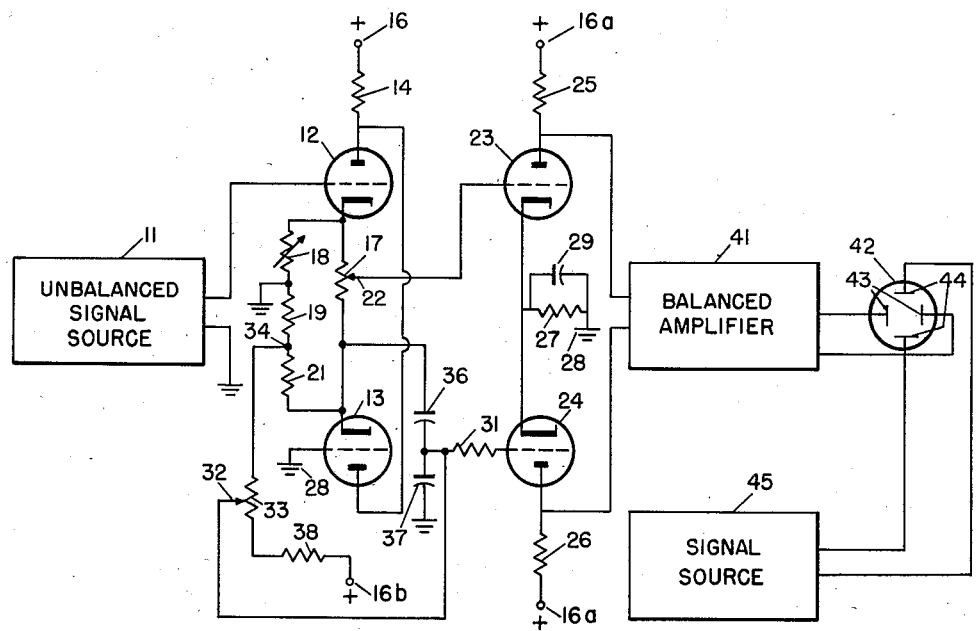
INVENTOR.
MEYER MARON
BY Darby & Darby
ATTORNEYS

Patented July 28, 1953

2,647,174

UNITED STATES PATENT OFFICE 2,647,174

ADJUSTABLE BEAM-TRACE-POSITIONING AMPLIFIER

Meyer Maron, Passaic, N. J., assignor to Allen B. Du Mont Laboratories, Inc., Clifton, N. J., a corporation of Delaware Application September 23, 1950, Serial No. 186,474

2 Claims. (Cl. 179—171)

The present invention is concerned with improvements in circuits for positioning cathode ray beams as used for example in cathode ray oscillographs.

Cathode ray oscillographs customarily use direct current amplifiers in order to be able to indicate direct current and low frequency alternating current signals. Balanced amplifier stages are generally utilized because of their well known advantages in direct current amplification. However, in such circuits it becomes important to be able to adjust the zero-signal beam trace position, both for centering the indication on the cathode ray screen and for being able to select a given portion of the indication for examination where desired.

The present invention provides improved readily usable beam-positioning means for these purposes. According to the present invention, beam positioning is provided by control of the bias of one tube of a balanced amplifier over a relatively wide range, thereby permitting wide range control of the beam position.

Other objects and advantages of the present invention will become apparent from considering the following description of a preferred embodiment thereof, taken in conjunction with the appended drawing which in its single figure shows a schematic wiring diagram partially in block form of a cathode ray oscillograph circuit incorporating the present invention.

In this figure the rectangle 11 designated as an unbalanced signal source represents any suitable source of unbalanced signal which it is desired to amplify before application to the deflecting means of a cathode ray tube. By way of example, this unbalanced signal source 11 may represent directly a generator of such signals or it may represent unbalanced input terminals for the oscillograph.

The unbalanced signal output from source 11 is applied to the control electrode of tube 12 of a first amplifier stage formed by tubes 12, 13. Tubes 12 and 13, while illustrated as in the form of triodes, may be any suitable amplifying tubes, such as of the tetrode, pentode, screen grid or other type. The anodes of tubes 12 and 13 are connected through a common resistor 14 to a source 16 of positive potential. It will be understood that the negative terminal of the source 16 is connected to ground.

The cathodes of tubes 12 and 13 are connected to the outer terminals of a potentiometer 17 serving as a gain control in the manner described and claimed in copending application Serial No. 186,478 of Peter S. Christaldi now Patent 2,631,200 issued March 10, 1953, entitled "Gain Control Circuits" filed concurrently herewith and assigned to the same assignee as the present application. Also connected to these cathodes is a balancing circuit comprising a variable resistor 18 connected between the cathode of tube 12 and ground and a pair of fixed resistors 19 and 21 connected between the cathode of tube 13 and ground. This balancing control circuit is described and claimed in my copending application Serial No. 186,473, entitled "D. C. Balance Adjustment" filed concurrently herewith and assigned to the same assignee as the present application. The grid of tube 13 is directly grounded at 28.

The variable tap 22 of the gain control potentiometer 17 is connected directly to the control electrode of tube 23 which together with tube 24 forms the following balanced amplifier stage. The anodes of tubes 23 and 24 are connected through respective load resistors 25, 26 to a source 16a of positive potential whose negative terminal is also grounded. Source 16a may be the same source as 16 where desired. The cathodes of tubes 23 and 24 are connected together and through a common cathode biasing resistor 27 to ground at 28. Resistor 27 is bypassed by condenser 29. To supply the signal voltage to the control electrode to tube 24, this control electrode is connected through a current-limiting resistor 31 to the variable tap 32 of a potentiometer 33, one terminal of which is connected to the junction of resistors 19 and 21. It will be apparent that, when a signal is applied to the control electrode of tube 12, it produces corresponding variations in the potential of the cathode of that same tube. This signal is supplied through potentiometer 17 to the cathode of tube 13, whose control grid is grounded, thereby applying a similar signal of opposite polarity to the input circuit of tube 13. A portion of this signal which appears between the cathode of tube 13 and ground is taken off at junction 34 and supplied to the control grid of tube 24 through a portion of potentiometer 33 and the resistor 31.

Because of the loss of low frequency components of the signal appearing at the cathode of tube 13 before its application to the control electrode of tube 24, a capacitative voltage divider formed by condensers 36 and 37 is connected between the cathode of tube 13 and ground. The junction of these condensers 36 and 37 is then connected through resistor 31 to the control grid of tube 24 to equalize the loss of high and low frequency components. In addition, the tubes 12 and 13 are supplied with a common plate resistor 14 similarly producing improvement in equalization. The resistor 14 is chosen of proper value to produce a signal at the cathode of tube 13 substantially equal in amplitude and opposite in phase to the signal otherwise present at that point, thus resulting in cancellation. This assures better high frequency response at the low end of the amplitude control 17.

To provide the control electrode of tube 24 with adjustable bias, the other terminal of potentiometer 33 is connected through a suitable fixed resistor 38 to a source 16b of positive potential whose negative terminal is also grounded. Source 16b may be the same as either or both sources 16 and 16a. It will be understood that the control of the bias of tube 24 by positioning control 33 serves to correspondingly control the plate current of tube 24 alone without affecting that of tube 23. This correspondingly alters the volt drop in resistor 26 and provides an unbalance in the output derived from the two anodes of tubes 23 and 24. This output is fed through a balanced amplifier 41 of any desired type to one pair of deflecting means of the cathode ray tube 42. In this instance, these deflecting means are illustrated as deflecting plates and the output of amplifier 41 is supplied to the horizontal plates 43. The vertical deflecting means, in the form of plates 44, are supplied by any suitable desired signal, as from a source 45.

The position control 33 has a relatively wide range of variation of bias on the control electrode of tube 24. In one system designed, this permits any portion of the pattern to be positioned on the screen, even with an expansion of six times the full screen diameter. This makes an instrument having a 5-inch tube equivalent to a 30 inch tube having a movable 5-inch mask which permits any 5-inch portion of the trace to be examined.

While the present invention has been illustrated with respect to a preferred embodiment thereof, it is to be understood that the foregoing description is illustrative only and is not to be taken in a limiting sense, the invention being defined solely by the appended claims.

What is claimed is:

1. An adjustable beam-trace-positioning amplifier for cathode ray oscillographs or the like, comprising a pair of electron tubes, an input circuit for one of said tubes adapted to have a signal applied thereto, means coupling the cathode of said one tube to the cathode of the other of said tubes to transfer said input signal to said other tube, the control electrode of said other tube being grounded, resistance means between each of said cathodes and ground, a second pair of electron tubes, the input electrode of one of said second tube pair being coupled to the cathode of said one tube of said first tube pair, a source of positive voltage, means coupling said source to the resistance means between the cathode of said other tube of said first tube pair and ground, said latter coupling means including a potentiometer and means coupling the variable tap of said potentiometer to the control electrode of the other tube of said second tube pair to adjustably control the bias thereof.

2. An amplifier as in claim 1 further including a pair of series-connected condensers connected between ground and the cathode of the other tube of said first tube pair, the junction of said condensers being coupled to the control electrode of the other tube of said second tube pair for frequency equalization.

MEYER MARON.

References Cited in the file of this patent

UNITED STATES PATENTS

| Number | Name | Date |
|---|---|---|
| 2,208,254 | Geohegan | July 16, 1940 |
| 2,240,635 | Avins | May 6, 1941 |
| 2,310,342 | Artzt | Feb. 9, 1943 |
| 2,329,073 | Mitchell et al. | Sept. 7, 1943 |
| 2,471,449 | Reade et al. | May 31, 1949 |
| 2,529,459 | Pourciau et al. | Nov. 7, 1950 |

FOREIGN PATENTS

| Number | Country | Date |
|---|---|---|
| 584,191 | Great Britain | Jan. 9, 1947 |